United States Patent
Wang et al.

(10) Patent No.: US 10,298,037 B2
(45) Date of Patent: May 21, 2019

(54) SMART CHARGING SYSTEMS FOR PORTABLE ELECTRONIC DEVICES

(71) Applicant: Apple Inc., Cupertino, CA (US)

(72) Inventors: Paul X. Wang, Cupertino, CA (US); Zheng Gao, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 15/721,461

(22) Filed: Sep. 29, 2017

(65) Prior Publication Data

US 2019/0103751 A1    Apr. 4, 2019

(51) Int. Cl.
*H02J 7/00* (2006.01)
*H01F 38/14* (2006.01)
*H01R 13/62* (2006.01)

(52) U.S. Cl.
CPC ............ *H02J 7/0045* (2013.01); *H01F 38/14* (2013.01); *H01R 13/6205* (2013.01); *H02J 2007/0098* (2013.01)

(58) Field of Classification Search
CPC ............ H02J 7/0045; H02J 2007/0098; H01R 13/6205; H01F 38/14
USPC ........................................................ 320/114
See application file for complete search history.

(56) References Cited

U.S. PATENT DOCUMENTS

| | | | |
|---|---|---|---|
| 4,038,625 A | 7/1977 | Tompkins et al. | |
| 5,325,046 A * | 6/1994 | Young | G05F 1/32 323/356 |
| 5,432,486 A | 7/1995 | Wong | |
| 7,210,940 B2 | 5/2007 | Bailey et al. | |
| 8,796,886 B2 * | 8/2014 | Tan | H02J 5/005 307/104 |
| 9,276,639 B2 * | 3/2016 | Terlizzi | H04B 5/0006 |
| 9,449,754 B2 * | 9/2016 | Graham | H01F 27/2823 |

* cited by examiner

*Primary Examiner* — M Baye Diao
(74) *Attorney, Agent, or Firm* — Kilpatrick Townsend & Stockton LLP (57) ABSTRACT

Embodiments describe a charging component for an electronic device that includes an interface surface comprising a portion of an external surface of a housing of the electronic device; a plurality of contacts positioned at the interface surface and exposed for making contact with contacts of a connector; one or more sensors for detecting a separation event; an inductor coil positioned proximate to the interface surface, wherein a central axis of the inductor coil is perpendicular to at least a portion of the interface surface; and a processor coupled to the inductor coil and the one or more sensors, wherein the processor is configured to change an operation of the inductor coil based at least in part on a measurement from the one or more sensors.

20 Claims, 9 Drawing Sheets

SMART CHARGING SYSTEMS FOR PORTABLE ELECTRONIC DEVICES

BACKGROUND

Portable electronic devices (e.g., laptop computers, tablets, mobile phones, media players, smart watches, and the like) operate when there is charge stored in their batteries. Some portable electronic devices include a rechargeable battery that can be charged by coupling the portable electronic device to a power source through a physical connection, such as through a charging cord. The charging cord typically includes a plug connector for mating with a receptacle connector in the portable electronic device. The plug connector mechanically couples with the receptacle connector by physically inserting into the receptacle connector so that electrical contacts in the plug connector mate with corresponding contacts in the receptacle connector to enable power transfer. When mated, the plug connector is securely attached to the receptacle connector via static frictional force that can only be separated by having a user physically pull the plug connector out of the receptacle connector.

Sometimes, however, the portable electronic device experiences a jolting event that causes the portable electronic device to dramatically jolt in one direction, such as when the portable electronic device is kicked or dropped. In such situations, the plug connector can be pulled in a direction that it is not intended to travel, thereby causing physical damage to the plug connector and/or the receptacle connector. To reduce such shortcomings, plug and receptacle connectors have been configured with magnets to assist with mating without the need for a strong static frictional force to exist between the two connectors. These connectors utilize magnetic forces to perform the coupling while providing easier disconnection. However, even though the severity of physical damage is reduced, magnetic connectors still have a high likelihood of suffering physical damage when experiencing a jolting event because the magnetic connectors maintain attracting force between the two connectors throughout the entire jolting event.

Furthermore, the plug connector often includes a visual indicator that emits a colored light indicating whether a successful mating between the two connectors has been achieved. This visual indicator is constantly on, thereby wasting power and decreasing the efficiency at which the portable electronic device receives power. Removing the visual indicator, however, makes it difficult to communicate to a user whether the connectors are successfully mated.

SUMMARY

Some embodiments of the disclosure provide a smart charging system for a portable electronic device. The smart charging system includes a magnetized connector and a charging component that can be configured to dynamically attract and repel the connector to and from the portable electronic device. By being able to control whether the connector is attracted or repelled, the charging component can substantially minimize damage to the connector and/or the charging component during a jolting event. For instance, the connector can be disconnected from the portable electronic device by the charging component before the jolting event occurs. Furthermore, in some embodiments, the magnetic connector includes a haptic device that can communicate to a user whether the connector is successfully coupled to the charging component. The haptic device allows the connector to communicate the connection status to a user in a short amount of time without needing to be constantly turned on, thereby increasing charging efficiency.

In some embodiments, a charging component for an electronic device includes an interface surface comprising a portion of an external surface of a housing of the electronic device; a plurality of contacts positioned at the interface surface and exposed for making contact with contacts of a connector; one or more sensors for detecting a separation event; an inductor coil positioned proximate to the interface surface, where a central axis of the inductor coil is perpendicular to at least a portion of the interface surface; and a processor coupled to the inductor coil and the one or more sensors, where the processor is configured to change an operation of the inductor coil based at least in part on a measurement from the one or more sensors.

In some additional embodiments, an electronic device includes: a housing; a battery disposed within the housing and configured to store energy and discharge the stored energy; and a charging component configured to receive power from an external power source to provide energy to the battery. The charging component includes: an interface surface comprising a portion of an external surface of a housing of the electronic device; a plurality of contacts positioned at the interface surface and exposed for making contact with contacts of a connector; one or more sensors for detecting a separation event; an inductor coil positioned proximate to the interface surface, where a central axis of the inductor coil is perpendicular to at least a portion of the interface surface; and a processor coupled to the inductor coil and the one or more sensors, where the processor is configured to change an operation of the inductor coil based at least in part on a measurement from the one or more sensors In some further embodiments, a smart charging system includes a connector and an electronic device configured to receive power by way of the connector. The connector includes: a mating surface; a permanent magnet positioned adjacent to the mating surface; a first communication contact positioned at the mating surface; and a haptic device configured to move the connector in response to one or more inputs from the first communication contact. The electronic device includes: a housing; a battery disposed within the housing and configured to store energy and discharge the stored energy; and a charging component configured to receive power from an external power source to provide energy to the battery. The charging component includes: an interface surface comprising a portion of an external surface of a housing of the electronic device; a plurality of contacts positioned at the interface surface and exposed for making contact with contacts of a connector; one or more sensors for detecting a separation event; an inductor coil positioned proximate to the interface surface, where a central axis of the inductor coil is perpendicular to at least a portion of the interface surface; and a processor coupled to the inductor coil and the one or more sensors, where the processor is configured to change an operation of the inductor coil based at least in part on a measurement from the one or more sensors.

A better understanding of the nature and advantages of embodiments of the present invention may be gained with reference to the following detailed description and the accompanying drawings.

DETAILED DESCRIPTION OF THE INVENTION

Embodiments of the disclosure describe a smart charging system capable of dynamically attracting and repelling a magnetic connector to and from a portable electronic device. The portable electronic device can be a consumer portable electronic device such as a laptop computer, tablet, smart phone, smart watch, and the like, that includes a charging component designed to modify a magnetic polarity at an interface surface with which the magnetic connector couples during charging. In some embodiments, the charging component can include a magnetic element and an inductor coil wound about the magnetic element. Depending on the direction of the current through the inductor coil, the inductor coil can induce a specific magnetic polarity across the magnetic element, thereby causing it to either attract or repel the magnetic connector at the interface surface. By being able to attract or repel the magnetic connector, the charging component can not only attract the magnetic connector when the portable electronic device is stationary or when the user intends for the magnetic connector to remain coupled with the charging component, but also repel the magnetic connector when the portable electronic device senses that a jolting event is imminent or that the user intends to disconnect the magnetic connector from the charging component.

The connector can also include a haptic device that can communicate a connection status to a user when the connector mates with the charging component of the portable electronic device. For example, the haptic device can briefly vibrate the connector when the connector successfully mates with the charging component. The user holding the connector can feel the vibration and acknowledge that the connector has made successful contact with the charging component. Thus, the connector does not require a visual indicator that is constantly turned on to indicate the connection status to the user. Aspects and features of embodiments of such a charging system are discussed in further detail herein.

I. Electronic Device

Figure 1:
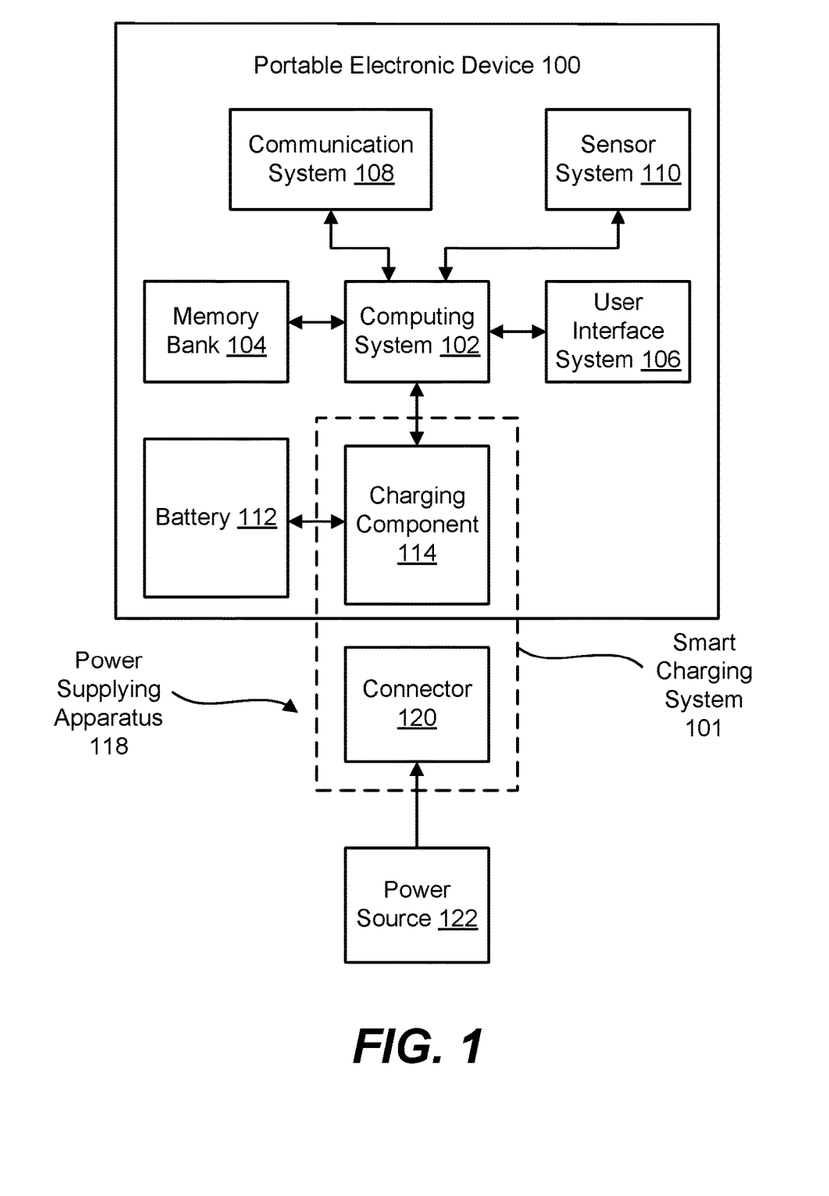
FIG. 1 is a block diagram illustrating an exemplary smart charging system, according to some embodiments of the present disclosure.

A portable electronic device is an electronic device that can operate without being coupled to a power grid by running on its own locally stored electrical power. The portable electronic device can be specifically designed to perform various functions for a user. In some embodiments, electronic device 100 is a consumer electronic device that can perform one or more functions for a user. For instance, electronic device 100 can be a smart phone, wearable device, smart watch, tablet, personal computer, and the like.

FIG. 1 is a block diagram illustrating an exemplary portable electronic device 100 and an exemplary power supplying apparatus 118 for coupling with device 100 to charge device 100, according to some embodiments of the present disclosure. Device 100 includes a computing system 102 coupled to a memory bank 104. Computing system 102 can execute instructions stored in memory bank 104 for performing a plurality of functions for operating device 100. Computing system 102 can be one or more suitable computing devices, such as microprocessors, computer processing units (CPUs), graphics processing units (GPUs), field programmable gate arrays (FPGAs), and the like.

Computing system 102 can also be coupled to a user interface system 106, a communication system 108, and a sensor system 110 for enabling electronic device 100 to perform one or more functions. For instance, user interface system 106 can include a display, speaker, microphone, actuator for enabling haptic feedback, and one or more input devices such as a button, switch, capacitive screen for enabling the display to be touch sensitive, and the like. Communication system 108 can include wireless telecommunication components, Bluetooth components, and/or wireless fidelity (WiFi) components for enabling device 100 to make phone calls, interact with wireless accessories, and access the Internet. Sensor system 110 can include light sensors, accelerometers, gyroscopes, temperature sensors, and any other type of sensor that can measure a parameter of an external entity and/or environment.

All of these electrical components require a power source to operate. Accordingly, electronic device 100 also includes a battery 112 for discharging stored energy to power the electrical components of device 100. To replenish the energy discharged to power the electrical components, electronic device 100 includes a charging component 114 for coupling with power supplying apparatus 118. Power supplying apparatus 118 can include a power source 122, such as an electrical outlet coupled to the utility grid or an external energy storage device (such as a portable battery), and a connector 120 for interfacing with charging component 114.

According to some embodiments of the present disclosure, charging component 114 can be configured to dynamically attract and repel connector 120 using electromagnetic forces to perform several functions. For instance, charging component 114 can dynamically attract and repel connector 120 to minimize damage from jolting events by repelling connector 120 before physical damage can occur. Additionally, it can dynamically attract and repel connector 120 to provide tactile feedback for indicating a mating event by exerting a force profile on connector 120 that is representative of a physical mating connection without succumbing to the shortcomings of a physical mating connection. Furthermore, charging component 114 can ease disconnection of connector 120 when it is determined that a user intends to disconnect connector 120 from portable electronic device 100, such as when a desired amount of charge has been stored in battery 112. In some embodiments, connector 120 includes a magnetic component that enables charging component 114 to interact with it. Thus, charging component 114 and connector 120 can operate as a system for charging portable electronic device 100. Accordingly, charging component 114 and connector 120 can form a smart charging system 101. Further details and embodiments of smart charging system 101 will be discussed further herein.

II. Smart Charging System for a Portable Electronic Device

According to some embodiments of the present disclosure, a smart charging system can include a charging component and a connector, where the charging component can dynamically attract and repel the connector to enable and disable power transfer between the two components. Furthermore, the charging component can alter and tune the force exerted on the connector as it mates with the charging component by modifying the electromagnetic force applied against the connector as it moves toward the charging component. This altering of force gives the connector a mechanical-like feel when it mates with the charging component. In some embodiments, the charging component can be configured to attract and repel the connector with or without a magnetic element, as will be discussed further herein.

A. Charging Components with Magnetic Elements

Figure 2:
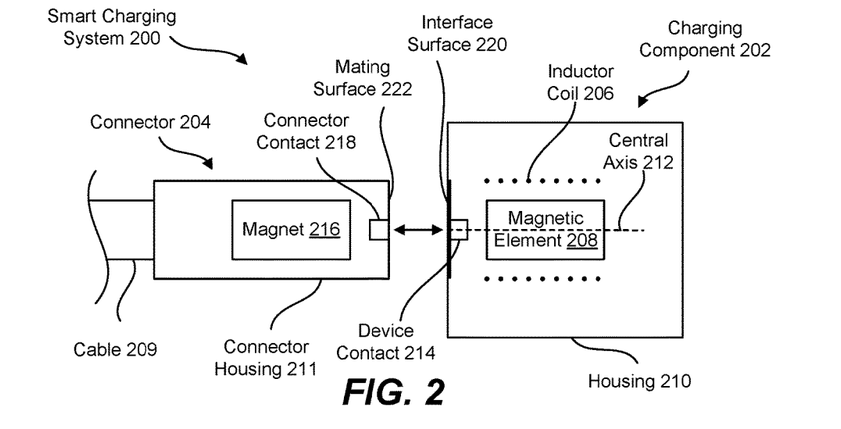
FIG. 2 is a simplified block diagram of an exemplary smart charging system, according to some embodiments of the present disclosure.

FIG. 2 is a simplified block diagram of an exemplary smart charging system 200, according to some embodiments of the present disclosure. Smart charging system 200 can include a charging component 202 and a connector 204 that can mate with charging component 202 to charge an electronic device. Connector 204 can be coupled to a cable 209 that can route power from an external power source to connector contact 218. In some embodiments, connector 204 can include a permanent magnet 216. Permanent magnet 216 can be positioned adjacent to mating surface 222 so that it can interact with external magnetic forces to move connector 204 toward or away from charging component 202, as will be discussed further herein. Permanent magnet 216 can be any suitable permanent that has a strong magnetic field, such as a neodymium magnet.

Charging component 202 can be a part of a portable electronic device that interfaces with connector 204 to receive power. Charging component 202 can include an interface surface 220 (shown as a bold line) that makes contact with a mating surface 222 of connector 204. Interface surface 220 can be part of an external surface of a housing 210 of the portable electronic device that makes physical contact with connector 204 when connector 204 is mated with charging component 202. Charging component 202 can also include a device contact 214 that makes contact with connector contact 218 when connector 204 is mated with charging component 202. When mated, device contact 214 can receive power from an external power source (e.g., power source 122 in FIG. 1) through connector contact 218 and device contact 214.

According to some embodiments of the present disclosure, charging component 202 can include an inductor coil 206 wound about a magnetic element 208. Inductor coil 206 can be a strand of conductive wire wound about a central axis 212, which can be positioned perpendicular to at least a portion of interface surface 220. Central axis 212 can even intersect at least a portion of interface surface 220 in some embodiments, as shown in FIG. 2. In some embodiments, inductor coil 206 can generate a magnetic field that defines a magnetic polarity of magnetic element 208 to attract or repel magnet 216 in connector 204, as discussed herein with respect to FIGS. 3A and 3B.

Figure 3A:
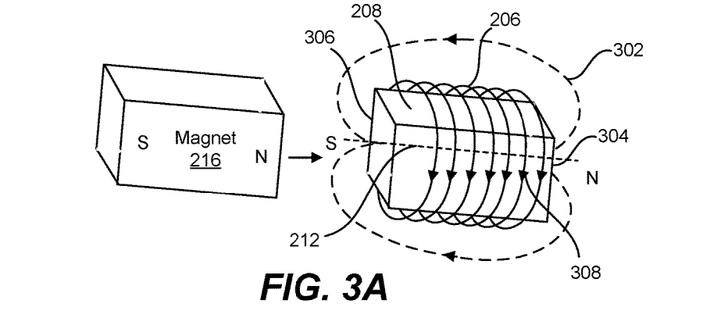
FIGS. 3A-3B are simplified diagrams illustrating exemplary attracting and repelling forces between a magnet and a polarity induced by inductor coil, according to some embodiments of the present disclosure.
Figure 3B:
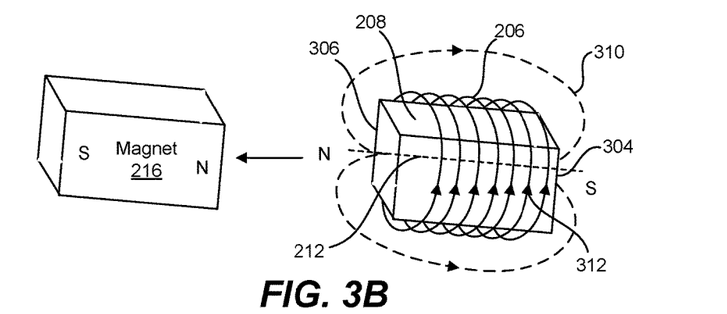

FIGS. 3A and 3B illustrate exemplary attracting and repelling forces between magnet 216 and a polarity induced by inductor coil 206. Specifically, FIG. 3A is a simplified diagram illustrating an attracting force between permanent magnet 216 and magnetic element 208 whose polarity is influenced by inductor coil 206, according to some embodiments of the present disclosure; and FIG. 3B is a simplified diagram illustrating a repelling force between permanent magnet 216 and magnetic element 208. In the embodiments shown in FIGS. 3A and 3B, the polarity of magnet 216 is oriented such that its end closest to magnetic element 208 is positive (i.e., its north pole), but that one skilled in the art understands that this is merely exemplary for ease of discussion and that disclosures can be reversed for instances where the polarity of magnet 216 is reversed.

With reference to FIG. 3A, to induce an attracting force, a current 308 can flow through inductor coil 206 in a clockwise direction to induce a magnetic field 302 propagating from a first end 304 of magnetic element 208 to a second end 306 opposite of first end 304. This magnetic field 302 can induce a corresponding magnetic polarity in magnetic element 208, thereby turning magnetic element 208 into a magnet where first end 304 is an acting north pole and second end 306 is an acting south pole. Accordingly, second end 306 attracts magnet 216 toward magnetic element 208, which can result in a mating between connector 204 and charging component 202 discussed herein with respect to FIG. 2.

With reference to FIG. 3B on the other hand, to induce a repelling force, a current 312 can flow through inductor coil 206 in a counter-clockwise direction to induce a magnetic field 310 propagating from second end 306 to first end 304. This magnetic field 310 can induce a corresponding magnetic polarity in magnetic element 208, thereby turning magnetic element 208 into a magnet where first end 304 is an acting south pole and second end 306 is an acting north pole. Thus, second end 306 repels magnetic 216 away from magnetic element 208, which can result in a separation between connector 204 and charging component 202 discussed herein with respect to FIG. 2.

In some embodiments, the attracting and repelling forces generated by inductor coil 206 can be varied according to a force profile that includes both attracting and repelling forces for mating connector 204 with charging component 202. The force profile can be experienced by a user's hand when the user intentionally moves connector 204 toward charging component 202 during mating. In some embodiments, the force profile is configured so that mating connector 204 with charging component 202 feels like a mechanical connection even though only an electromagnetic connection has been made. The force profile for a mechanical connection can help indicate to a user when mating has occurred by the way the forces exerted on connector 204 feel when it is mated with charging component 202. An exemplary force profile is shown in FIG. 4.

Figure 4:
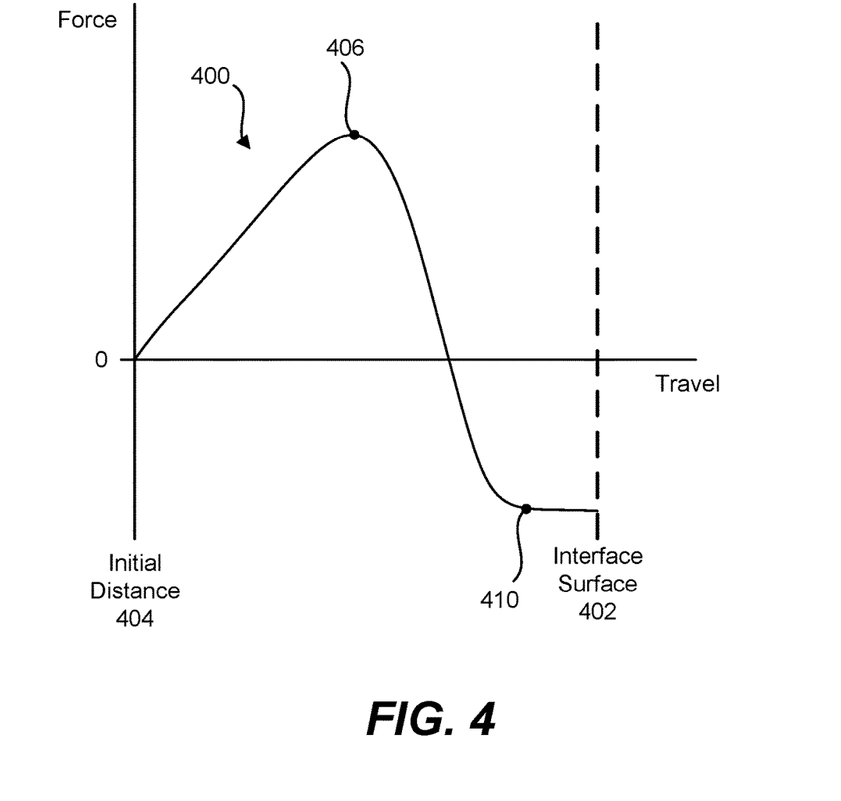
FIG. 4 is a graphical illustration of an exemplary force profile generated by an inductor coil during mating between a connector and a charging component, according to some embodiments of the present disclosure.

FIG. 4 is a graphical illustration of an exemplary magnetic force profile 400 generated by an inductor coil during mating between a connector and a charging component, according to some embodiments of the present disclosure. The y-axis represents magnitudes of force exerted on a connector, where positive magnitudes indicate a degree of repelling force and negative magnitudes indicate a degree of attracting force. Specifically, magnitudes increasing upwards represent increasing repelling forces against a connector, and magnitudes increasing downwards represent increasing attracting forces against the connector. The x-axis represents degrees of travel with respect to an interface surface 402 for a charging component. Thus, traversing along the x-axis towards the right from an initial distance 404 represents the movement of a connector toward interface surface 402 from initial distance 404. Initial distance 404 may be a distance at which an inductor coil begins to initiate force profile 400.

At initial distance 404, force profile 400 induced by the inductor coil can exert little to no repelling force against a connector. As the connector moves toward the charging component, the inductor coil can begin to gradually increase a repelling force against the connector. This gradual increase in repelling force can mimic the feel of a mechanical connection where a plug begins to insert into a socket. The repelling force can increase until a peak 406 where force profile 400 stops the increase in repelling force and begins a drastic decrease in repelling force and into a drastic increase in attracting force. Peak 406 can mimic the feel of the mechanical connection where the plug is just about fully inserted into the socket. And, the sudden decrease in repelling force and increase in attracting force can mimic the feel of the mechanical connection where the plug fully inserts into the socket. At peak 410, the inductor coil can generate a sustained attracting force that keeps the connector mated with the charging component, thereby completing the mating process. In some embodiments, the slope of force profile 400 between initial distance 404 and peak 406 is less dramatic than the slope of force profile 400 between peak 406 and 410. Larger slopes of force profile 400 between peak 406 and 410 can result in a feeling on the connector that mimics a clicking action of a mechanical connection. Accordingly, force profile 400 can allow an electromagnetic connection to feel more mechanical in nature, thereby enhancing user experience and feedback.

With reference back to FIG. 2, the polarity of magnetic element 208 can be influenced by inductor coil 206 to attract or repel connector 204. Thus, magnetic element 208 can be a structure formed of any suitable material whose magnetic polarity can be influenced by an external magnetic field. For instance, magnetic element 208 can be formed of a conductive structure that can acquire magnetic properties when a magnetic field is induced across it, such as an iron structure. When a magnetic field is induced across the iron structure, the iron structure can have a magnetic polarity induced by the polarity of the magnetic field, as discussed herein with respect to FIGS. 3A and 3B. Due to the nature of a conductive material, the induced magnetic properties can remain as long as the magnetic field exists. Once, the magnetic field ceases, however, the conductive material may no longer have magnetic properties. Thus, inductor coil 206 may need to be constantly turned on even though connector 204 has already mated with charging component 202.

In some embodiments, instead of being formed of iron, magnetic element 208 can be formed of a highly coercive magnet that can maintain a magnetic polarity even when inductor coil 206 is turned off. For instance, magnetic element 208 can be a magnet formed of an aluminum, nickel, and cobalt (AlNiCo) alloy. Such coercive magnets can change their polarity based on a magnetic field exposed on it. Thus, when magnetic element 208 is formed as a coercive magnet, it can still change in polarity as discussed herein with respect to FIGS. 3A and 3B. However, unlike some conductive structures (e.g., iron structures discussed herein), coercive magnets can maintain their magnetic polarity even after inductor coil 206 stops generating the magnetic field. Thus inductor coil 206 can be turned off after connector 204 has mated with charging component 202. Using a highly coercive magnet as magnetic element 208 can help reduce power consumption as power is not constantly needed for generating an attracting force once connector 204 has mated with charging component 202. In some embodiments, magnetic element 208 can amplify the magnetic field at interface surface 220, thereby creating a stronger attracting or repelling force.

Figure 5A:
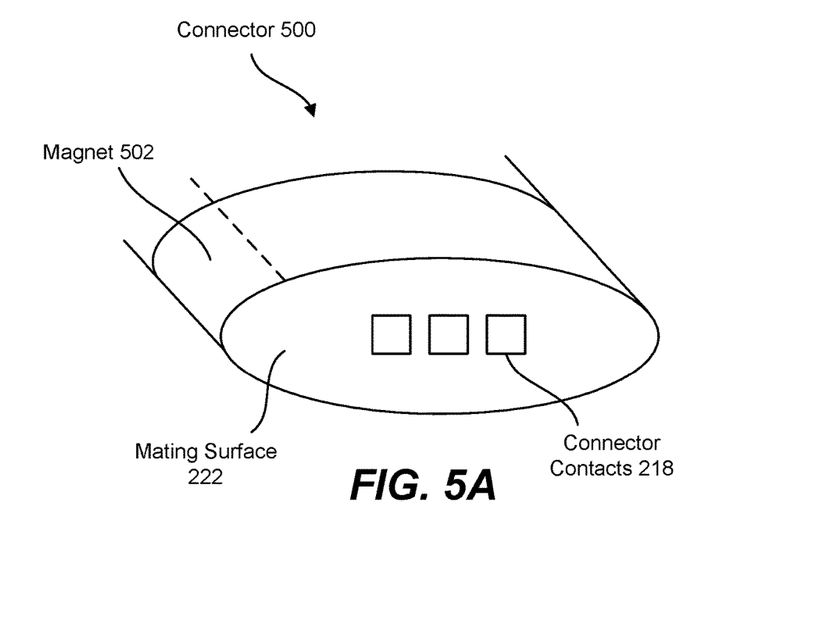
FIG. 5A is a simplified diagram illustrating a perspective view of a connector having a magnet that forms the entire mating surface, according to some embodiments of the present disclosure.
Figure 5B:
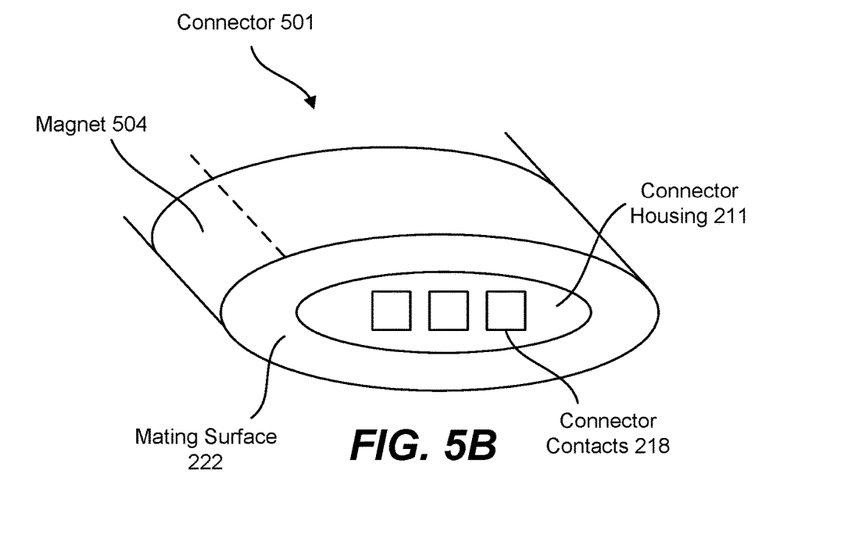
FIG. 5B is a simplified diagram illustrating a perspective view of a connector having a magnet that forms part of the mating surface, according to some embodiments of the present disclosure.

As shown in FIG. 2, magnet 216 can be positioned within a connector housing 211. Connector housing 211 can be formed of a non-conductive material that can protect the inner components of connector 204, such as one or more internal wires coupled with connector contact 218. Although FIG. 2 illustrates that mating surface 222 is formed by connector housing 211, embodiments are not so limited. Some embodiments can have magnet 216 form part of mating surface 222, as shown in FIGS. 5A and 5B. Forming at least a portion of a mating surface as a magnet results in a stronger attracting and repelling force between a connector and a charging component because the attracting and repelling force is stronger when the distance between them decreases.

FIG. 5A is a simplified diagram of a connector 500 having a magnet 502 that forms the entire mating surface 222 (save for connector contacts 218), according to some embodiments of the present disclosure. Connector 500 can have an oval cross-sectional shape as shown, but is not limited to such configurations. Other embodiments can have different sizes and shapes according to design. For instance, some embodiments can have a cross-sectional shape resembling a rectangle, circle, square triangle, or any other suitable shape. Magnet 502 can be configured to perform the same functions and serve the same purpose as magnet 216 in FIG. 3. As can be seen from FIG. 5A, a vast majority of mating surface 222 can be formed of magnet 502, thereby allowing the entire mating surface 222 to be influenced by magnetic element 208. In some embodiments, however, mating surface 222 does not have to be substantially formed of magnet 502 in order to be influenced by magnetic element 208. For instance, a part of mating surface 222 can be formed of a magnet as shown in FIG. 5B.

FIG. 5B is a simplified diagram of a connector 501 having a magnet 504 that forms part of mating surface 222, according to some embodiments of the present disclosure. Magnet 504 can be configured to perform the same functions and serve the same purpose as magnet 216 in FIG. 3. Unlike magnet 502, magnet 504 can be formed as an annular structure that forms part of mating surface 222. In some embodiments, mating surface 222 can include a central portion formed by connector housing 211 and an outer portion surrounding connector housing 211 formed by magnet 502.

B. Charging Components without Magnetic Elements

As discussed herein with respect to FIG. 2, a charging component can include a magnetic element that can be influenced by a magnetic field from an inductor coil to attract and repel a connector. However, it is to be appreciated that other charging components may not include the magnetic element for attracting and repelling a connector. In such cases, the inductor coil itself can generate a magnetic field that directly attracts and repels a connector toward and away from a cavity in a housing of a portable electronic device, as will be discussed further herein.

Figure 6:
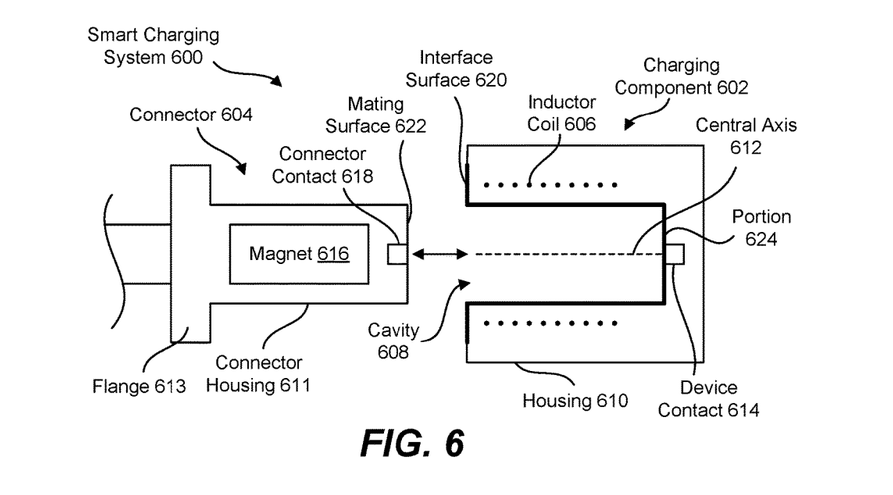
FIG. 6 illustrates an exemplary smart charging system including a connector and a charging component that does not include a magnetic element, according to some embodiments of the present disclosure.

FIG. 6 illustrates an exemplary smart charging system 600 including a connector 604 and a charging component 602 that does not include a magnetic element, according to some embodiments of the present disclosure. Similar to charging system 200, connector 604 can include a magnet 616, and charging component 602 can be a part of housing 610 and can include inductor coil 606. Thus, magnet 616 and inductor coil 606 can be configured to have the same function and purpose as magnet 216 and inductor coil 206 in FIG. 2.

Unlike FIG. 2, however, charging component 602 may not include a magnetic element. Instead, charging component 602 can include a cavity 608 within which at least a portion of connector housing 611 can insert so that magnet 616 can be directly influenced by an operation of inductor coil 606. Inductor coil 606 can generate a magnetic field (as discussed herein with respect to FIGS. 3A and 3B) that induces an attracting or repelling force on magnet 616 when connector 604 is brought close to charging component 602, such as when a portion of connector housing 611 is inserted into cavity 608 of charging component 602. Cavity 608 can act as an alignment mechanism for coupling connector contact 618 with device contact 614. Furthermore, cavity 608 can confine connector 604 when mated with charging component 602 to prevent connector 604 from sliding against interface surface 620 and disconnecting connector contact 618 from device contact 614.

In some embodiments, connector housing 611 can include a flange 613 that rests on interface surface 620 when connector 604 is mated with charging component 602. Flange 613 can help spread out and minimize the force exerted against connector contact 218 and mating surface 622 when connector 604 is mated with charging component 602. As shown in FIG. 6, interface surface 620 (shown in bold lines) can include surfaces within cavity 608 as well as portions just outside cavity 608 that make contact with connector 604 during mating. Similar to central axis 212 of inductor coil 206 in FIG. 2, central axis 612 of inductor coil 606 can be perpendicular to at least a portion of interface surface 620. For instance, central axis 612 can be perpendicular to a portion 624 of interface surface 620 positioned at the inner-base of cavity 608 closest to device contact 614. In some embodiments, central axis 612 intersects portion 624 and can be positioned within cavity 608 so that inductor coil 606 winds around cavity 608. By positioning inductor coil 606 around cavity 608, magnetic fields generated by inductor coil 606 can propagate through cavity 608 and thus exert a magnetic force against magnet 616 when at least a portion of magnet 616 is positioned in cavity 608. Accordingly, inductor coil 606 can dynamically attract and repel connector 604 according to a force profile (e.g., force profile 400 in FIG. 4) to mate connector 604 with charging component 602 so that power transfer can occur between connector contact 618 and device contact 614. Additionally, inductor coil 606 can repel connector 604 to separate connector 604 from charging component 602 and prevent damage to connector 604 during a jolting event.

Figure 7:
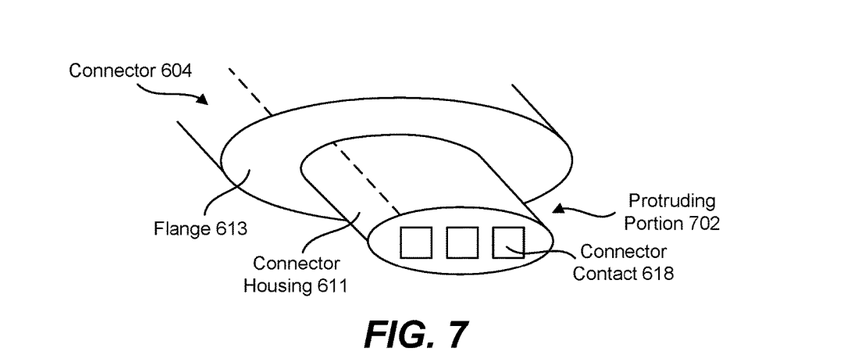
FIG. 7 is a simplified diagram illustrating a perspective view of a connector for a charging component that inserts into a cavity of a charging component, according to some embodiments of the present disclosure.

FIG. 7 is a simplified diagram illustrating a perspective view of connector 604, according to some embodiments of the present disclosure. As shown, flange 613 can extend radially outward past edges of a protruding portion 702 of connector housing 611. Protruding portion 702 can be the portion of connector housing 611 that inserts into cavity 608 of charging component 602. When mated, connector contacts 618 can make contact with device contact 614 to transfer power from a power source to the portable electronic device.

C. Charging Components with Magnetic Elements and Cavities

As discussed herein, a charging component can include a magnetic element and not a cavity in some embodiments (e.g., FIG. 2), and may include a cavity and not a magnetic element in other embodiments (e.g., FIG. 6). However, embodiments are not limited to only these configurations. Some embodiments can have a charging component that includes both a magnetic element and a cavity, as shown in FIG. 8.

Figure 8:
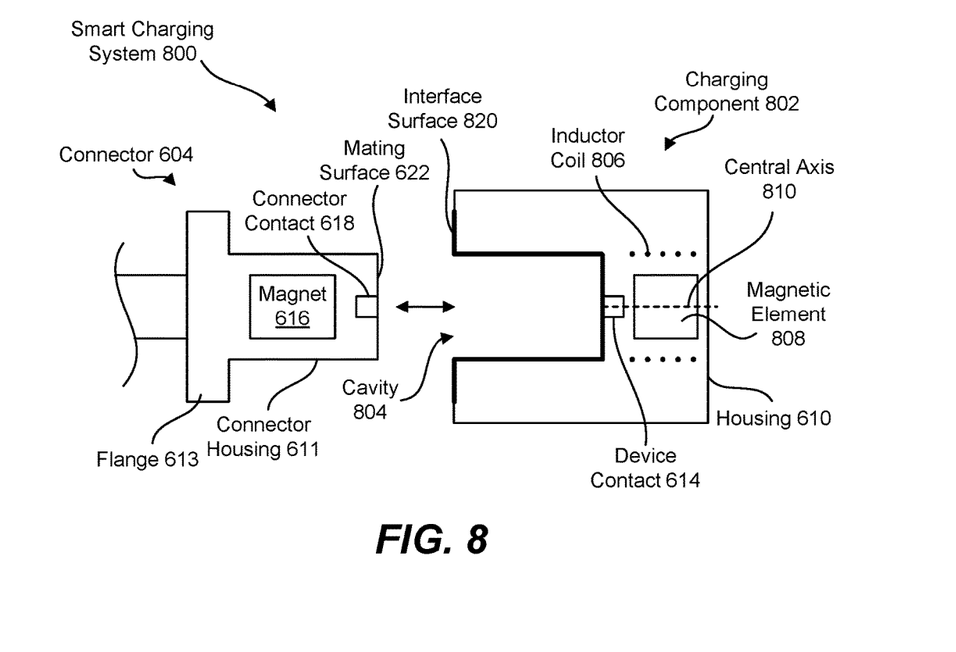
FIG. 8 illustrates an exemplary smart charging system including a charging component that includes both a cavity and a magnetic element, according to some embodiments of the present disclosure.

FIG. 8 illustrates an exemplary smart charging system 800 including a charging component 802 that includes both a cavity 804 and a magnetic element 808, according to some embodiments of the present disclosure. Having both cavity 804 and magnetic element 808 results in a charging component that can both provide a stronger attracting/repelling force and provide an alignment mechanism for mating with a connector. For instance, magnetic element 808 can be a highly coercive magnet that can be induced with a magnet field generated by inductor 806, as discussed herein with respect to FIGS. 3A and 3B. When polarized, magnetic element 808 can amplify a magnetic force generated by inductor coil 806 that attracts and repels magnet 616 (and connector 604) toward and away from charging component 802. Cavity 804 can act as an alignment mechanism for coupling connector contact 618 with device contact 614, and can confine connector 604 when mated with charging component 802 to prevent connector 604 from sliding against interface surface 820 and disconnecting connector contact 618 from device contact 614. As shown in FIG. 8, inductor coil 806 and magnetic element 808 can be positioned beside cavity 804 such that a central axis 810 of inductor coil 806 is perpendicular to and intersects interface surface 820.

III. Sensors for Detecting a Separation Event in a Smart Charging System

Smart charging systems discussed herein include a charging component that can dynamically attract and repel a connector. Specifically, the charging component can attract the connector to perform mating for power transfer, and repel the connector to separate the connector from the charging component. Being able to dynamically repel the connector away from the charging component can prevent damage to the connector and/or the charging component in the event of a jolting event. Furthermore, the charging component can ease the way at which the connector disconnects from the charging component by assisting the user in separating the connector from the charging surface by providing a repelling force as the user pulls the connector away from the charging component. According to some embodiments of the present disclosure, one or more sensors can be implemented in the connector and/or the charging component to enable the dynamic repelling of the connector, as will be discussed further herein with respect to FIGS. 9A-9C.

Figure 9A:
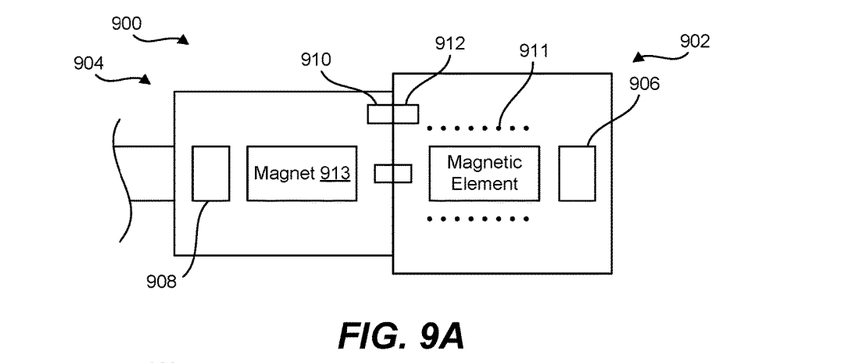
FIGS. 9A-9C are simplified diagrams illustrating smart charging systems having different sensors for detecting a separation event, according to some embodiments of the present disclosure.
Figure 9B:
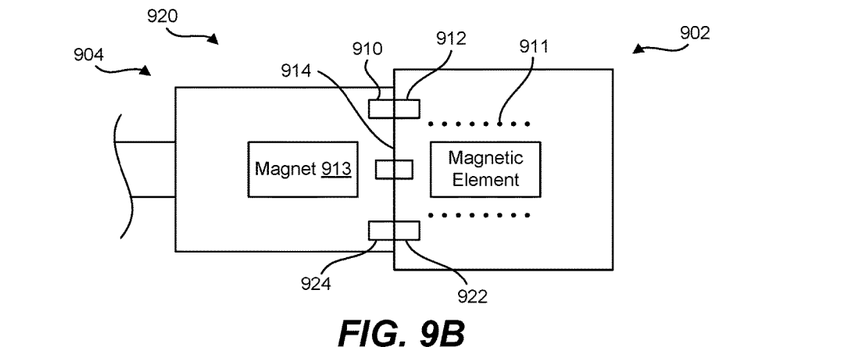
Figure 9C:
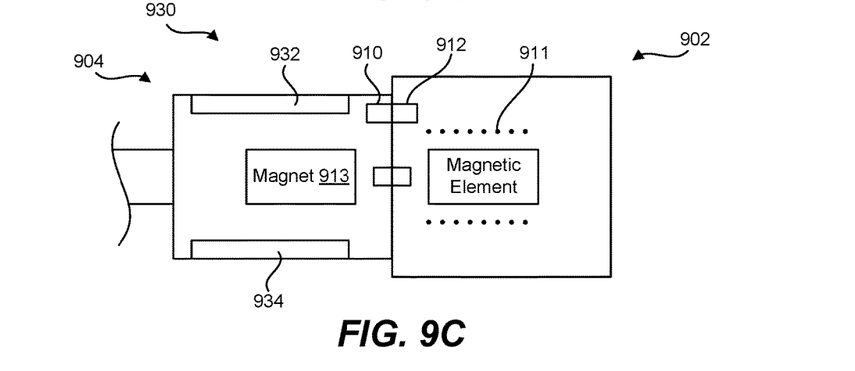

FIGS. 9A-9C are simplified diagrams illustrating smart charging systems having different sensors for detecting a separation event, according to some embodiments of the present disclosure. A separation event can be an event that indicates a disconnection is needed and causes a connector to disconnect from a charging component. For instance, a separation event can be a jolting event, such as when a portable electronic device is accidentally kicked, falling at a fast speed, impacting a hard surface after being dropped from an elevated position, or any other event that indicates the portable electronic device is experiencing, or will immediately experience, a sudden movement that could cause damage to the connector and/or charging component. The smart charging systems in FIGS. 9A-9C are based upon the smart charging system discussed herein with respect to FIG. 2. Thus, electrical components in FIGS. 9A-9C that are similar to the electrical components in FIG. 2, have the same functions and purposes as those corresponding components in FIG. 2. Details of those functions and purposes can be referenced from the disclosures regarding FIG. 2 and are not discussed here for ease of discussion.

FIG. 9A is a simplified diagram of an exemplary smart charging system 900 with one or more movement sensors, according to some embodiments of the present disclosure. For instance, charging component 902 can include a movement sensor 906 that is embedded within charging component 902. Movement sensor 906 can be configured to detect the degree and intensity at which charging component 902 is moving. As an example, movement sensor 906 can be an accelerometer that can detect a sudden increase in velocity experienced by charging component 902. When charging component 902 is suddenly moved (e.g., kicked or has impacted a hard surface), movement sensor 906 can detect the intensity of change in the form of a measured movement intensity value.

A computing system (e.g., computing system 102 in FIG. 1) of the portable electronic device of which charging component 902 is a part can receive the measurements from movement sensor 906 and compare the measured movement intensity value to a threshold movement intensity value. If the measured movement intensity value is greater than the threshold movement intensity value, then the computing system can induce a current through inductor coil 911 to repel magnet 913 and thus separate connector 904 from charging component 902 to minimize damage to connector 904 and/or charging component 902 by separating them before the jolting event occurs or decoupling them during the jolting event. In some embodiments, a processor of the computing system can be included as part of charging component 902 for performing the comparing and the inducing of current through inductor coil 911 because the processor performs calculations regarding the operation of charging component 902.

Although FIG. 9A illustrates charging component 902 as having movement sensor 906, embodiments are not so limited. In some instances, a movement sensor 908 can be positioned in connector 904 instead of charging component 902. In such embodiments, the portable electronic device can receive the measured intensity value from movement sensor 908 through an electrical connection between two communication contacts: a connector communication contact 910 and a device communication contact 912. Communication contacts 910 and 912 can be exposed contacts that couple to one another when connector 904 is mated with charging component 902. When mated, communication contacts 910 and 912 enable connector 904 to communicate with the portable electronic device through charging component 902 so that the computing system can cause inductor coil 911 to separate connector 904 from charging component 902 before or during a jolting event. In additional or alternative instances, both charging component 902 and connector 904 can include their own movement sensors, e.g., sensors 906 and 908, respectively, as shown in FIG. 9A.

In addition to movement sensors for detecting a separation event, other sensors, such as optical sensors, can also be used to detect a separation event. The separation event may be a jolting event, or an event where the user initiates disconnection of connector from the charging component by beginning to pull the connector away from the charging component. FIG. 9B is a simplified diagram of an exemplary smart charging system 920 with one or more optical sensors, according to some embodiments of the present disclosure. For instance, charging component 902 can include an optical sensor 922 that is positioned at an interface surface 914 of charging component 902. Optical sensor 922 can be configured to detect a slight separation of connector 904 from charging component 902. As an example, optical sensor 922 can detect an intensity of light. When connector 904 is mated with charging component 902, optical sensor 922 may not detect any light. However, when there is a slight separation of connector 904 from charging component 902, then optical sensor 922 may begin to sense an intensity of light in the form of a measured light intensity. The measured light intensity can be received by the computing system, which can compare the measured light intensity to a threshold light intensity value. If the measured light intensity is greater than the threshold light intensity value, then the computing system can induce a current through inductor coil 911 to repel magnet 913 and thus separate connector 904 from charging component 902.

Although FIG. 9B illustrates charging component 902 as having optical sensor 922, embodiments are not so limited. In some instances, optical sensor 922 can be positioned in connector 904 instead. In such embodiments, the portable electronic device can receive the measured intensity value from optical sensor 906 through an electrical connection between connector communication contact 910 and device communication contact 912. In additional or alternative instances, both charging component 902 and connector 904 can include their own optical sensors, e.g., sensors 922 and 924, respectively. FIG. 9B illustrates optical sensors 922 and 924 as being positioned near the bottom of charging component 902 and connector 904, respectively; however, embodiments are not so limited. Optical sensors 922 and 924 can be positioned at any location suitable for detecting light when separation has occurred.

In some embodiments, one or more capacitive sensors can also be used in a smart charging system to detect a separation event. The separation event may be an event where the user indicates that he or she intends to disconnect the connector from the charging component by touching the connector. FIG. 9C is a simplified diagram of an exemplary smart charging system 930 with one or more capacitive sensors, according to some embodiments of the present disclosure. For instance, connector 904 can include a first capacitive sensor 932 and a second capacitive sensor 934. First and second capacitive sensors 932 and 934 can be positioned at surfaces of connector 904 where a user's finger may make contact with connector 904 when the user intends to disconnect connector 904 from charging component 902. As an example, first capacitive sensor 932 can be positioned at a top surface of connector 904, and second capacitive sensor 934 can be positioned at a bottom surface of connector 904 opposite of the top surface; or first and second sensors 932 and 934 can be position on opposite lateral sides of connector 904.

Capacitive sensors 932 and 934 can be configured to detect and measure anything that is conductive or has a dielectric different from air. As an example, capacitive sensors 932 and 934 can measure a capacitive value when a user's finger approaches one of or both capacitive sensors 932 and 934. The portable electronic device can receive the measured capacitive values from capacitive sensors 932 and 934 through the electrical connection between connector communication contact 910 and device communication contact 912, and compare the measured capacitive values to a threshold capacitive value. If the measured capacitive values are greater than the threshold capacitive value (i.e., indicating that the user has both fingers on connector 904 and thus intends to separate connector 904 from charging component 902), then the computing system can induce a current through inductor coil 911 to repel magnet 913, thereby separating connector 904 from charging component 902. If only one sensor measures a capacitor value greater than the threshold capacitor value, the computing system may not cause a repelling of connector 904 because it may not be a clear indication that a user intends to disconnect connector 904 from charging component 902.

It is to be appreciated that the computing system can cause an attracting and repelling of connector 904 for any reasonable purpose unrelated to a jolting event or an indication of user intent to disconnect the two components. As an example, the computing system can cause charging component 902 to repel connector 904 when the battery is fully charged. Charging a battery after it is fully charged can detrimentally affect its energy storage performance. Thus, charging component 902 can be configured to repel connector 904 when the battery has fully charged so that the battery is no longer receiving charge. In some embodiments, charging component 902 can also be configured to re-attract connector 904 after the amount of energy stored in the battery has decreased below a threshold charge level (e.g., 85% of energy capacity) and the portable electronic device has not moved for a long period of time (e.g., at least three hours, such as when the device is plugged for the night). Thus, charging component 902 can maintain a high level of charge in the battery without enabling the battery to be constantly coupled to a power source and detrimentally affecting its energy storage performance.

IV. Haptic Devices for a Smart Charging System

In addition to providing the force profile by varying attracting and repelling forces, a smart charging system can improve user feel and feedback by including one or more haptic devices. A haptic device is an electronic device that can recreate the sense of touch by applying forces, vibrations, or motions to a user. According to some embodiments of the present disclosure, a haptic device can be embedded within a connector and/or a charging component to provide haptic feedback to indicate the occurrence of a successful mating between the connector and the charging component.

Figure 10:
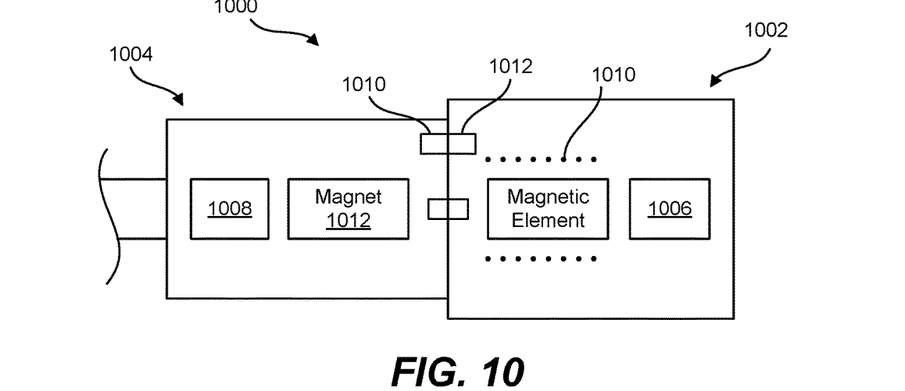
FIG. 10 is a simplified diagram of an exemplary smart charging system with one or more haptic devices, according to some embodiments of the present disclosure.

FIG. 10 is a simplified diagram of an exemplary smart charging system 1000 with one or more haptic devices, according to some embodiments of the present disclosure. Smart charging system 1000 is based upon the smart charging system discussed herein with respect to FIG. 2. Thus, electrical components in FIG. 10 that are similar to the electrical components in FIG. 2, have the same functions and purposes as those corresponding components in FIG. 2. Details of those functions and purposes can be referenced from the disclosures regarding FIG. 2 and are not discussed here for ease of discussion.

In some embodiments, charging component 1002 can include a haptic device 1006 that is embedded within charging component 1002. Haptic device 1006 can be any electromechanical device configured to move, shake, and/or vibrate and, as a result, cause charging component 1002 to move, shake, and/or vibrate in a corresponding manner. In some embodiments, haptic device 1008 can be positioned in connector 1004 instead of charging component 1002. In such embodiments, a computing system of the portable electronic device can command haptic device 1008 to vibrate by sending electrical signals to haptic device 1006 through communication contacts 1010 and 1012. When mated, communication contacts 1010 and 1012 enable connector 1004 to communicate with the portable electronic device through charging component 1002 so that the computing system can instruct haptic device 1008 to vibrate when a successful mating has been made between connector 1004 and charging component 1002. In additional or alternative instances, both charging component 1002 and connector 1004 can include their own haptic devices, e.g., devices 1006 and 1008, respectively, as shown in FIG. 10.

Figure 11A:
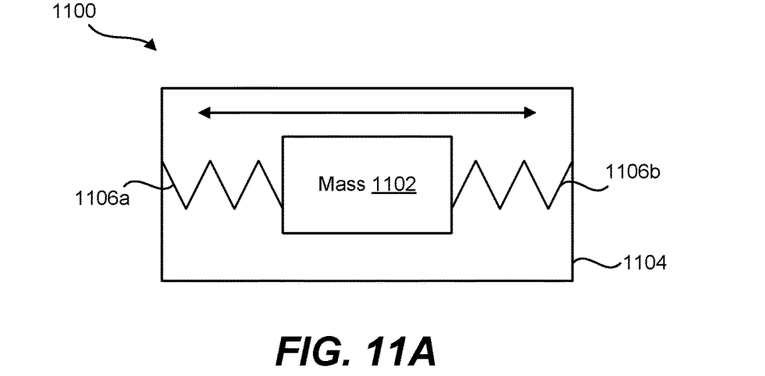
FIG. 11A is a simplified diagram illustrating an exemplary linear resonance actuator.

As mentioned herein, haptic device 1006/1008 can be any electromechanical device configured to move, shake, and/or vibrate. For instance, haptic device 1006/1008 can be a linear resonance actuator (LRA) that can oscillate a mass back and forth to create vibration. FIG. 11A is a simplified diagram illustrating an exemplary LRA 1100. In some embodiments, LRA 1100 can include a mass 1102 suspended in an enclosure 1104 by a pair of springs 1106a and 1106b. Mass 1102 can be a magnetic structure that can be influenced by a magnetic field to move back and forth in the left and right directions to generate a vibrating force. In some embodiments, mass 1102 can move toward the left at a first speed and toward the right at a second speed. The first and second speeds can be the same to generate a stationary vibrating force. However, the first and second speeds can be different in some embodiments to generate a non-stationary vibrating force. For example, the second speed can be faster than the first speed to generate a non-stationary vibrating force that is stronger toward the right direction than the left direction, so that when LRA 1100 is vibrating, it feels as though LRA 1100 is shifting to the right.

Figure 11B:
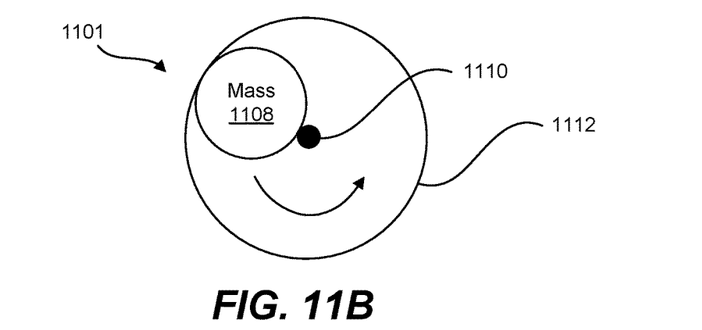
FIG. 11B is a simplified diagram illustrating an exemplary eccentric rotating mass vibration motor.

In other instances, haptic device 1106/1108 can be an eccentric rotating mass vibration motor (ERM) that can rotate an unbalanced mass in a circular motion to create a force that translates to vibrations, as shown in FIG. 11B. FIG. 11B is a simplified diagram illustrating an exemplary ERM 1101. ERM 1101 can include a motor 1112 that can spin a central axis 1110. A mass 1108 can be attached to central axis 1110 and thus rotate around central axis 1110 to generate a vibrational force.

Figure 12:
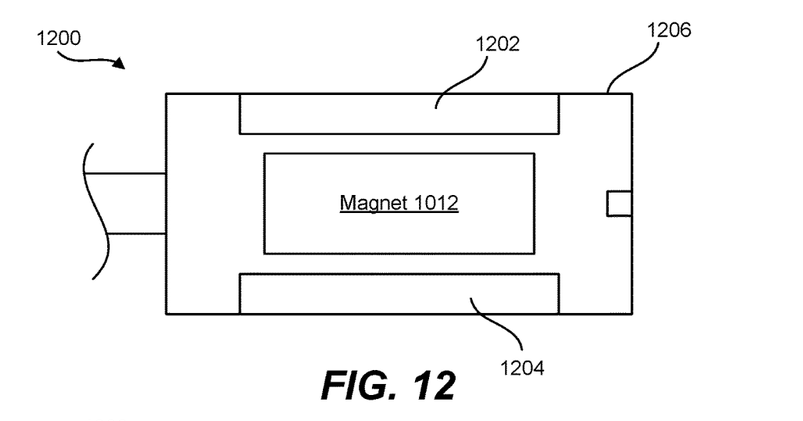
FIG. 12 is a simplified diagram of an exemplary connector of a smart charging system with one or more haptic devices positioned at one or more surfaces of a connector housing, according to some embodiments of the present disclosure.

In addition to using LRA and ERM components as haptic devices, other forms of actuators can be used. For instance, piezoelectric actuators can be used to form a haptic device 1106/1008. FIG. 12 is a simplified diagram of an exemplary connector 1200 of a smart charging system with one or more haptic devices 1202 and 1204 positioned at one or more surfaces of a connector housing 1206, according to some embodiments of the present disclosure. Haptic devices 1202 and 1204 can be positioned at the outer surfaces of connector housing 1206 so that a user can touch haptic devices 1202 and 1204. For instance, haptic devices 1202 and 1204 can be positioned at the top and bottom outer surfaces, or the side surfaces, of connector housing 1206.

In some embodiments, haptic devices 1202 and 1204 can be formed of piezoelectric actuators, which are actuators that can change dimensions when an electric potential is applied across it. The piezoelectric actuators can be mounted on a deflector that can accentuate the degree of deflection when the piezoelectric actuator is activated so that a user can feel a stronger vibration, as shown in FIGS. 13A and 13B.

Figure 13A:
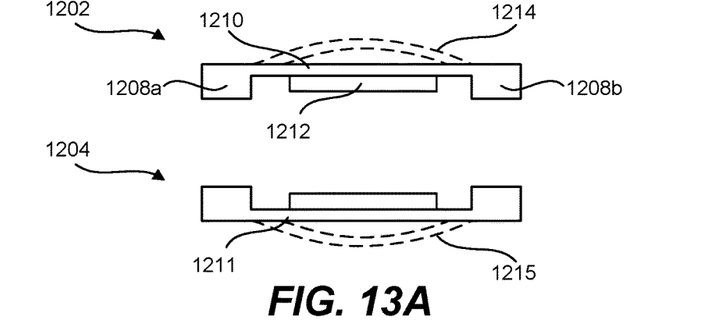
FIG. 13A is a simplified diagram illustrating haptic devices as fix-fix beam haptic devices, according to some embodiments of the present disclosure.
Figure 13B:
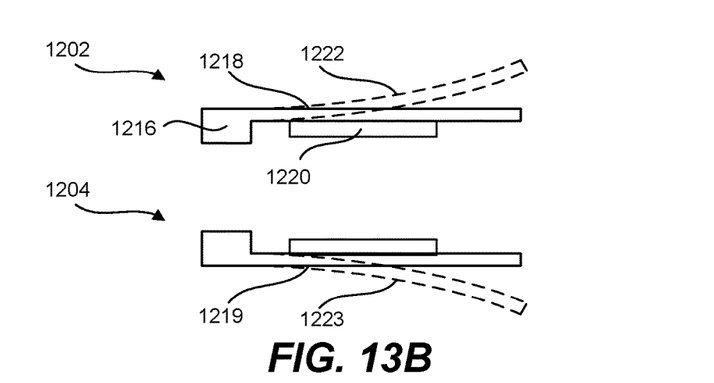
FIG. 13B is a simplified diagram illustrating haptic devices as cantilever beam haptic devices, according to some embodiments of the present disclosure.

FIG. 13A is a simplified diagram illustrating haptic devices 1202 and 1204 as fix-fix beam haptic devices, where each haptic device includes a first base 1208a, a second base 1208b, and a beam 1210 extending between first and second bases 1208a and 1208b. A piezoelectric actuator 1212 can be mounted on an underside of beam 1210 so that when piezoelectric actuator 1212 activates, it can expand and contract and cause beam 1210 to oscillate between a flat, resting position and a deflecting position 1214. In deflecting position 1214, beam 1210 can extend outward and press against a user's finger. By oscillating between the resting position and deflecting position 1214, the resulting effect can feel like a vibration. Haptic device 1204 can be identical to haptic device 1202, but just arranged as a mirror images of each other so that when positioned in deflecting position 1215, beam 1211 is bent outward.

In addition to fix-fix beam haptic devices, haptic devices 1202 and 1204 can be configured as cantilever beam haptic devices in some embodiments. FIG. 13B is a simplified diagram illustrating haptic devices 1202 and 1204 as cantilever beam haptic devices, where each haptic device includes a base 1216 coupled to one end of a beam 1218. A piezoelectric actuator 1220 can be mounted on an underside of beam 1218 so that when piezoelectric actuator 1220 activates, it can expand and contract and cause beam 1218 to oscillate between a flat, resting position and a deflecting position 1222 to generate a vibrating sensation on a user's fingers. Haptic device 1204 can be identical to haptic device 1202, but just arranged as a mirror images of each other so that when positioned in deflecting position 1223, beam 1219 is bent outward.

Using haptic devices in smart charging systems helps provide additional feedback to a user to indicate whether a successful connection has been made between a connector and a charging component. For instance, the haptic devices can generate a vibration when the computing system determines that a successful connection has been made. The computing system can determine that a successful connection is made when power is able to flow between the connector and the charging component.

Although the invention has been described with respect to specific embodiments, it will be appreciated that the invention is intended to cover all modifications and equivalents within the scope of the following claims.

What is claimed is:

1. A charging component for an electronic device, comprising:
    an interface surface comprising a portion of an external surface of a housing of the electronic device;
    a plurality of contacts positioned at the interface surface and exposed for making contact with contacts of a connector;
    one or more sensors for detecting a separation event;
    an inductor coil positioned proximate to the interface surface, wherein a central axis of the inductor coil is perpendicular to at least a portion of the interface surface; and
    a processor coupled to the inductor coil and the one or more sensors, wherein the processor is configured to change an operation of the inductor coil based at least in part on a measurement from the one or more sensors.

2. The charging component of claim 1, wherein the central axis intersects at least a portion of the interface surface.

3. The charging component of claim 1, further comprising a magnetic element disposed within the housing of the electronic device and proximate to the interface surface.

4. The charging component of claim 3, wherein the inductor coil is wound around at least a portion of the magnetic element and configured to generate a magnetic field through the magnetic element to define a magnetic polarity of the magnetic element.

5. The charging component of claim 1, wherein the one or more sensors includes at least one of a movement sensor, optical sensor, or an accelerometer.

6. The charging component of claim 1, wherein the processor is configured to change an operation of the inductor coil to disconnect the charging component from an external power source.

7. The charging component of claim 6, wherein the sensor is an accelerometer or an optical sensor.

8. An electronic device, comprising:
    a housing;
    a battery disposed within the housing and configured to store energy and discharge the stored energy; and
    a charging component configured to receive power from an external power source to provide energy to the battery; wherein the charging component comprises:
        an interface surface comprising a portion of an external surface of a housing of the electronic device;
        a plurality of contacts positioned at the interface surface and exposed for making contact with contacts of a connector,
        one or more sensors for detecting a separation event;
        an inductor coil positioned proximate to the interface surface, wherein a central axis of the inductor coil is perpendicular to at least a portion of the interface surface; and
        a processor coupled to the inductor coil and the one or more sensors, wherein the processor is configured to change an operation of the inductor coil based at least in part on a measurement from the one or more sensors.

9. The electronic device of claim 8, wherein the central axis intersects at least a portion of the interface surface.

10. The electronic device of claim 8, further comprising a magnetic element disposed within the housing of the electronic device and proximate to the interface surface.

11. The electronic device of claim 10, wherein the inductor coil is wound around at least a portion of the magnetic element and configured to generate a magnetic field through the magnetic element to define a magnetic polarity of the magnetic element.

12. The electronic device of claim 8, wherein the one or more sensors includes at least one of a movement sensor, optical sensor, or an accelerometer.

13. A smart charging system, comprising:
    a connector comprising:
        a mating surface;
        a permanent magnet positioned adjacent to the mating surface;
        a first communication contact positioned at the mating surface; and
        a haptic device configured to move the connector in response to one or more inputs from the first communication contact;

and an electronic device configured to receive power by way of the connector; the electronic device comprising
a housing;
a battery disposed within the housing and configured to store energy and discharge the stored energy; and
a charging component configured to receive power from an external power source to provide energy to the battery; wherein the charging component comprises:
an interface surface comprising a portion of an external surface of a housing of the electronic device;
a plurality of contacts positioned at the interface surface and exposed for making contact with contacts of a connector;
one or more sensors for detecting a separation event;
an inductor coil positioned proximate to the interface surface, wherein a central axis of the inductor coil is perpendicular to at least a portion of the interface surface; and
a processor coupled to the inductor coil and the one or more sensors, wherein the processor is configured to change an operation of the inductor coil based at least in part on a measurement from the one or more sensors.

14. The smart charging system of claim 13, wherein the inductor coil is controllable to attract the permanent magnet in the connector to the interface surface and repel the permanent magnetic in the connector from the interface surface.

15. The smart charging system of claim 14, wherein the inductor coil is configured to attract the permanent magnetic according to a force curve comprising an initial repelling force followed by a subsequent attracting force.

16. The smart charging system of claim 13, wherein the charging component further comprises a second communication contact positioned at the interface surface corresponding to the position of the first communication contact such that the first and second communication contacts couple together when the interface surface makes contact with the mating surface.

17. The smart charging system of claim 16, wherein the one or more inputs are sent from the electronic device to the haptic device through the first and second communication contacts.

18. The smart charging system of claim 17, wherein the electronic device is configured to command the haptic device to vibrate the connector upon a determination that the interface surface has made contact with the mating surface.

19. The smart charging system of claim 13, wherein the central axis intersects at least a portion of the interface surface.

20. The smart charging system of claim 13, further comprising a magnetic element disposed within the housing of the electronic device and proximate to the interface surface.

* * * * *